United States Patent [19]
Cimini, Jr. et al.

[11] Patent Number: 6,005,876
[45] Date of Patent: Dec. 21, 1999

[54] METHOD AND APPARATUS FOR MOBILE DATA COMMUNICATION

[75] Inventors: Leonard Joseph Cimini, Jr., Howell; Nelson Ray Sollenberger, Tinton Falls, both of N.J.

[73] Assignee: AT&T Corp, New York, N.Y.

[21] Appl. No.: 08/718,718

[22] Filed: Sep. 24, 1996

[51] Int. Cl.$^6$ ............................................. H04J 3/12
[52] U.S. Cl. ..................... 370/525; 370/203; 375/200; 375/260
[58] Field of Search ..................... 370/208, 320, 370/335, 342, 468, 525, 526, 203, 522; 375/200, 203, 260

[56] References Cited

U.S. PATENT DOCUMENTS

| | | | |
|---|---|---|---|
| 5,442,625 | 8/1995 | Gitlin et al. | 370/342 |
| 5,473,601 | 12/1995 | Rosen et al. | 370/319 |
| 5,507,035 | 4/1996 | Bantz et al. | |
| 5,734,646 | 3/1998 | I et al. | 370/335 |
| 5,751,705 | 5/1998 | Sato | 370/335 |
| 5,781,541 | 7/1998 | Schneider | 370/335 |
| 5,781,583 | 7/1998 | Bruckert et al. | 375/206 |
| 5,805,575 | 9/1998 | Kamin, Jr. | 370/335 |
| 5,867,478 | 2/1999 | Baum et al. | 370/203 |

OTHER PUBLICATIONS

M. Sawahashi and F. Adachi, *Multicarrier 16QAM transmission with diversity reception*, Mar. 14, 1996, Electronic Letters, vol. 32, No. 6, pp. 522–523.

Lauterbach, Thomas, Bosch, Robert, *Using Eureka 147 for Mobile Multimedia*, Feb., 1996, Mobile Communications International, pp. 53–58.

*Primary Examiner*—Ajit Patel
*Assistant Examiner*—Bob A Phunkulh

[57] ABSTRACT

A high-speed wireless transmission system is employable in a macro-cellular environment. In the system multiple transmit antennas are employed. Multiple carrier tones are used to transmit the data. The carrier tones can be assigned to the respective transmit antennas in such a manner as to provide each antenna with a subset of carrier tones with each subset being spread over the transmission spectrum. In addition, operation is enhanced by providing Reed-Solomon coding of the data across consecutive time intervals.

13 Claims, 5 Drawing Sheets

METHOD AND APPARATUS FOR MOBILE DATA COMMUNICATION

BACKGROUND OF THE INVENTION

The present invention relates to a method and apparatus for facilitating mobile data communication, such as high speed data. The invention is specifically related to a new arrangement for assigning carrier tones to a plurality of antennas and a coding technique to provide reliable, high-speed wireless access to mobile users in macrocells.

As more and more people come to rely on wireless communication and as Internet usage becomes more popular as well, it becomes desirable to provide the ability for mobile wireless users to have multimedia access such as to the Internet. However, effective multi-media access requires a high-speed communication capability such as, for example, a bit rate of 1 to 2 Mbps.

It is currently known to provide a wireless data system with high bit rates over a short distance such as in a wireless LAN environment. A co-pending provisional U.S. patent application, entitled CLUSTERED OFDM WITH TRANSMITTER DIVERSITY AND CODING (U.S. Provisional Application No. 60/011,601, filed Mar. 8, 1996), describes a technique for providing such a high bit rate wireless LAN. In that technique an input data stream is encoded to allow for error/erasure correction in a receiver. Then, a multicarrier (or multitone) signal is formed. For multicarrier, the basic idea is to divide the transmitted bandwidth into many narrow subchannels that are transmitted in parallel. Each subchannel is then modulated at a very low rate to avoid significant intersymbol interference (ISI). The disclosed method employs Orthogonal Frequency Division Multiplexing (OFDM) a multiplexing technique described in for example, "Data Transmission by Frequency-Division Multiplexing Using the Discrete Fourier Transform" by Weinstein et al., IEEE Trans. Commun. Technol. Vol. COM-19, No. 5, October 1971, pp. 628–634 and "Multicarrier Modulation for Data Transmission: An Idea Whose Time Has Come," by Bingham, IEEE Commun. Mag., Vol. 28, No. 5, May 1990, pp. 5–14. In the method disclosed in the provisional application groups of adjacent tones are clustered together and separate clusters are provided to different ones of a plurality of separate independent antennas. A single receive antenna is then used to demodulate the OFDM signal with conventional techniques.

A mobile data system has particular problems which limit the ability to provide high speed multi-media access. The main impairments encountered in a mobile radio environment are delay spread, doppler and path loss as represented by reduced received signal power. Delay spread refers to the fact that because the signal will experience a wireless path that will have different impacts on different frequencies it is likely that the entire signal will not be received at the receiver at the same instant in time. A delay will be introduced. The delay spread in the macrocellular environment could be as large as 40 $\mu$sec which could limit the data rate to about 50 Kbaud if no measures are taken to counteract the resulting ISI. In the 2 GHz PCS bands the doppler rate could be as high as 200 Hz (i.e., a mobile unit moving at about 67 mph). Furthermore, the received signal power is inversely related to the data rate such that, for example, at a data rate of 1Mbaud (approximately 50 times that of a typical voice circuit) there is a shortfall of at least 15 dB in received power compared to cellular voice services and this creates a link budget problem. Thus, without any system modification the coverage and performance of such systems will be severely limited. In fact, in the present wireless systems that cover a wide area with mobile receivers, bit rates of 10 to 20 Kbps have been achieved. Therefore, it is desirable to adapt the wireless transmission systems to facilitate high-speed data communications.

SUMMARY OF THE INVENTION

The present invention achieves the desired high-speed wireless transmission by modifying the system to correct for the effects of delay spread and path loss. The present invention proposes an asymmetric service: a high-speed down link (for example 1 to 2 Mbps peak data rates, or more) and a lower bit rate lower uplink (for example 50–100Kbs). This would alleviate the problem of increasing power consumption at the mobile terminal to overcome the 15 dB shortfall in received power. Nonetheless, it should still be sufficient for most applications, such as Web browsing, voice access, e-mail, and interactive computing.

Furthermore, the present invention provides an Orthogonal Frequency Division Multiplexing (OFDM) system that has narrow enough subchannels and sufficient guard period to minimize the effects of delay spreads as large as 40 $\mu$sec.

To overcome the 15 dB shortfall in link-budget, the present invention provides transmit antenna diversity and coding across frequencies. In one example the base station has four transmit antennas. Each antenna is assigned to transmit a subset of the total number of tones. A particular subset is composed of a plurality of widely spaced tones covering the entire transmission bandwidth. As a consequence a subset of tones on a second antenna will include tones between those transmitted on the first antenna. Alternatively each subset of tones for a given transmit antenna can include widely spaced clusters of tones, e.g., two or three adjacent tones, which cover the entire transmission bandwidth. Spreading the tones over the transmit antennas randomizes the fading across the OFDM bandwidth.

The coding is also selected to help reduce the link-budget problem. The digital data are encoded using Reed-Solomon (R-S) encoding where symbol words within R-S codewords are created by time-grouping modulation symbols that are consecutive in time. The encoding uses a combination of erasure correction, based on signal strength, and error correction.

When the tone antenna assignment technique and the coding operation are combined the link-budget problem is substantially alleviated.

In alternative embodiments the mobile station may include receive antenna diversity. Also, the assignment of tones to the transmit antennas can be arranged such that the same tone is transmitted simultaneously by two or more antennas. In yet another modification the tones assigned to a given antenna can be changed over time so that the effect of any negative correlation between a given tone and a given transmission path from a transmit antenna to a receive antenna can be minimized.

DETAILED DESCRIPTION

Figure 1A:
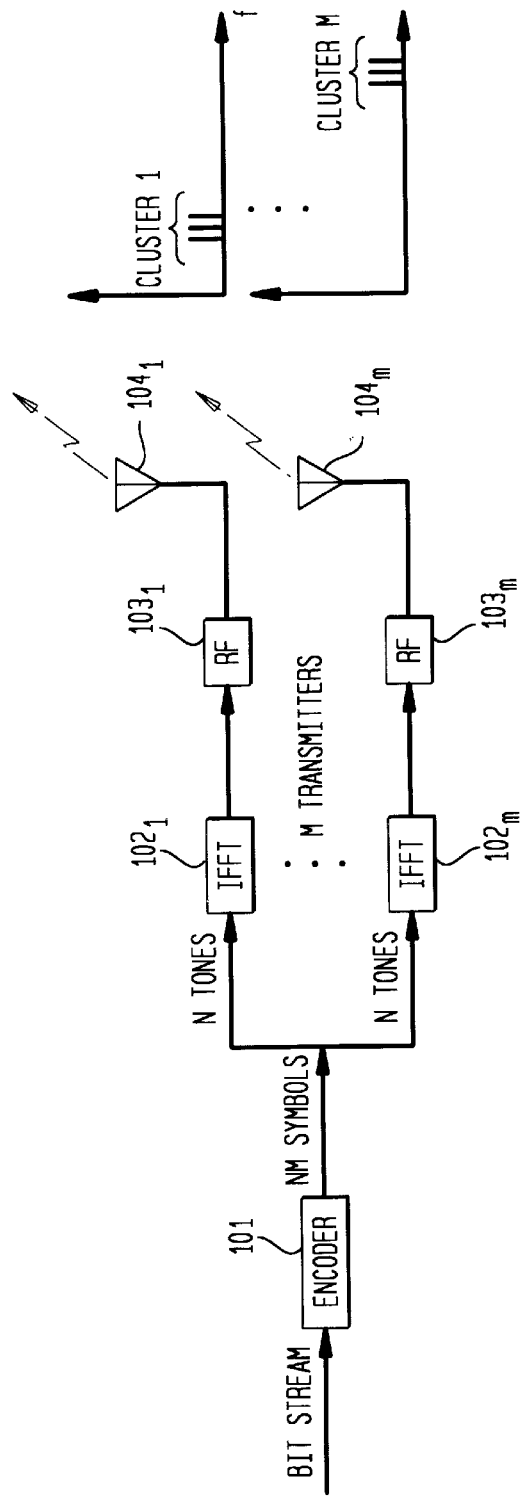
FIGS. 1(A) and 1(B) respectively illustrate possible configurations of a transmitter and a receive station in a wireless LAN environment.
Figure 1B:
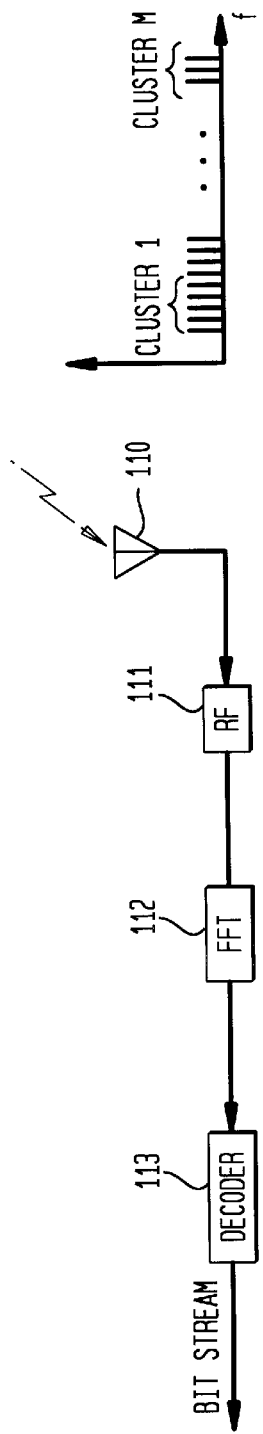

An example of a wireless transmission system in a LAN environment such as described in the above-referenced provisional application is illustrated in FIG. 1(A)–(B). A data bit stream is provided to an encoder 101 which produces a plurality of symbols. In this instance the encoder produces N×M symbols. N tones are assigned to each of M antennas, e.g., $104_1 \ldots 104_M$. The first N tones are provided to IFFT (Inverse Fast Fourier Transformers) $102_1$ while the Mth group of N tones is provided to IFFT $102_m$. Each group of tones is provided to RF circuitry (e.g., filter and amplifier), e.g., $103_1 \ldots 103_M$ and then passed on to its respective transmit antenna 104. The total number of tones (N×M) equals the total number of carriers in the multicarrier OFDM configuration. The carriers are spread out over the transmission spectrum.

Graphical representations are provided adjacent to each antenna $104_1$ to $104_M$ to illustrate that a given antenna is assigned a particular cluster of adjacent tones or carrier frequencies. Each cluster is part of a very localized portion of the overall transmission spectrum.

The M clusters of tones are transmitted from the M transmit antennas simultaneously and received by the receive antenna 110. As can be seen from the adjacent graphical representation, the antenna receives all of the clusters nearly simultaneously.

The antenna provides the received multicarrier signal to RF circuitry 111 which then provides the processed signal to FFT 112. The resultant data corresponds to the N×M symbols produced by the encoder 101 in FIG. 1(A) and the decoder 113 receives these symbols and provides as an output the data bit stream. What is not shown in the graphical representation is that the receive antenna 110 may receive different frequencies at different strengths. In the mobile environment multi-path propagation may pose a significant problem for such a configuration such that certain of the frequencies may be so seriously faded as to have essentially dropped out.

Figure 2:
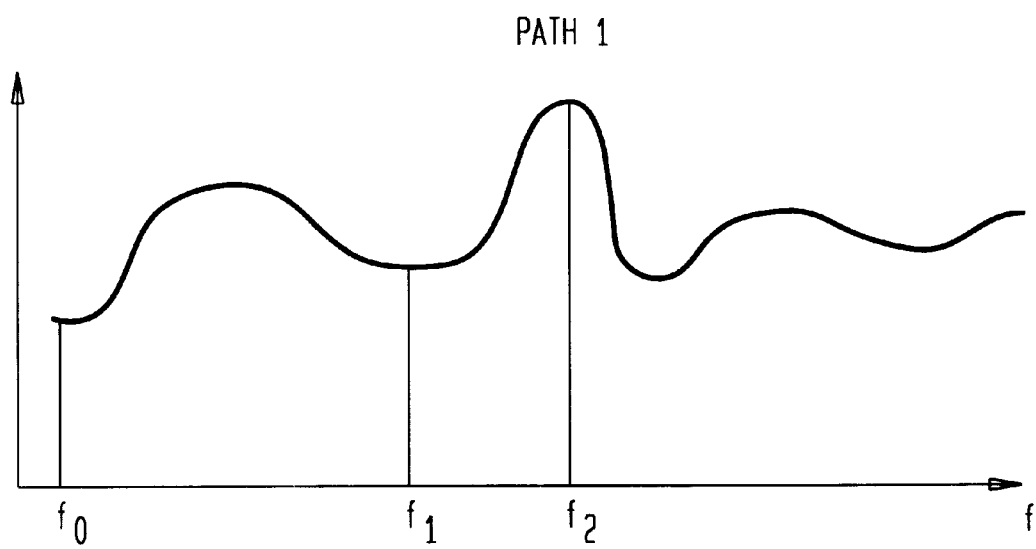
FIG. 2 illustrates a possible frequency characteristic of a given transmission path from one transmission antenna to one receive antenna.

It is considered that the channel from one of the transmit antennas to the receive antenna can be different from the channel from another transmit antenna to the receive antenna. These are considered separate and distinct paths. Each path has its own frequency response characteristic. For instance, as illustrated in the graphical representation of FIG. 2, a first path may more successfully transmit frequencies in the range of $f_2$ while having more difficulty transmitting frequencies in the range of $f_0$ and $f_1$. Thus, the inventors recognized that for a number of tones in the region of $f_0$ (or $f_1$) if those tones are clustered together and are the sole cluster provided along antenna 1, then the signal from antenna 1 will either be difficult to detect at the receiver or will likely contain many errors due to the path's characteristics.

To remedy this problem the inventors propose to provide a spreading out of the carrier tones across the transmission spectrum. This will counteract any frequency dependence that a particular path might have by optimizing the chances that each path will substantially transmit useful and correct information.

Figure 3:
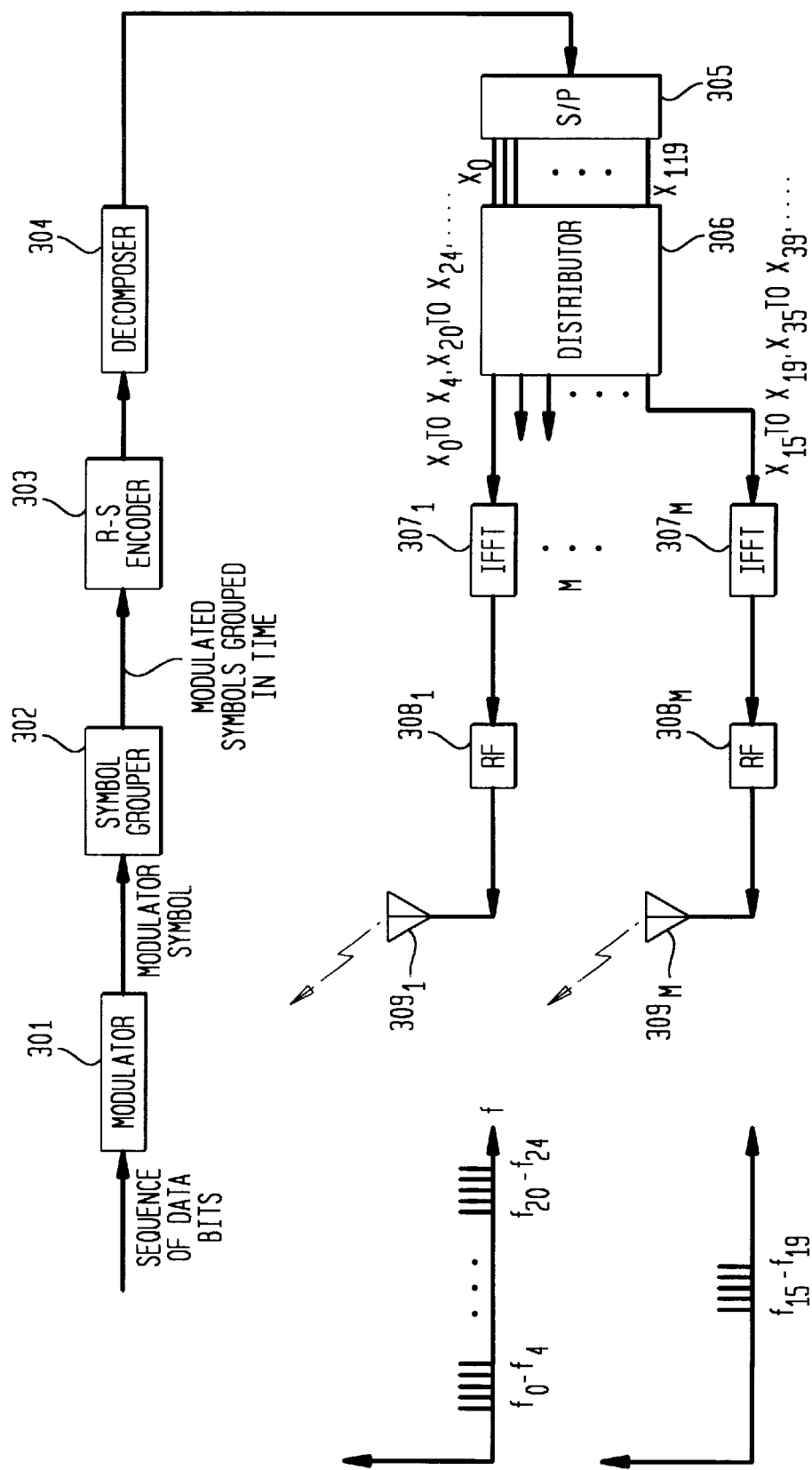
FIG. 3 illustrates in block diagram form an embodiment of the present invention.

As illustrated in a first embodiment of the present invention shown in FIG. 3, a sequence of data bits is provided to a modulator 301 that creates a modulator symbol. The modulator symbols are grouped, encoded and subsequently decomposed by elements 302, 303 and 304 as will be described in further detail later. The resultant data stream is converted to a parallel stream of data by serial-to-parallel converter 305. As an example, 120 symbols of data are provided in parallel ($X_0$ to $X_{119}$). Where the symbols are QPSK modulated each consists of two bits. Other modulators can be used to create either symbols such as 8-PSK symbols. A distributor receives this 120 parallel symbol block of data. Each of the 120 symbols corresponds to one of 120 carrier tones to be used in the multi-carrier OFDM configuration. The distributor can send clusters of symbols to each of M IFFTs ($307_1$ to $307_m$). In the present example the distributor sends groups of five symbols corresponding to five carrier tones to each of the IFFTS. In the present example it is proposed that M=4 so that there are four transmit antennas ($309_1$ to $309_M$) providing four separate paths to a single receive antenna. The distributor therefore provides thirty symbols of the 120 symbols to each of the transmit antenna paths. It does so in five-symbol clusters that are spread out over the entirety of the transmission spectrum, i.e., IFFT $307_1$ receives symbols at $X_0$ to $X_4$, $X_{20}$ to $X_{24}$, $X_{40}$ to $X_{44} \ldots X_{100}$ to $X_{104}$. Similarly, the remaining IFFTs also receive clusters of symbols assigned to carrier tones that are spread over the transmission spectrum. Therefore, as shown in the graphical representations associated with antennas $309_1$ and $309_m$ in FIG. 3, the first antenna sends out six clusters of tones. These tones are spread over the entire transmission spectrum. As can be seen the six clusters transmitted by antenna $309_M$ are interleaved with the clusters transmitted by $309_1$. Although not shown, the clusters for $309_2$ and $309_3$ (where M=4) are also interleaved with the clusters of tones to be transmitted on the other antennas.

In summary then, the problem of the frequency dependence of a given path from one antenna to the receive antenna and the path's susceptibility to adversely affecting the overall transmission characteristic when it only transmits a cluster of the multiple carrier tones, are overcome by providing a subset of the carrier tones to each of the antennas where the subset for a given antenna is spread over the entire transmission spectrum. As a consequence, not all of the tones on a given antenna are adjacent to one another. In fact, where tones on antenna 1 are not adjacent to one another (e.g., tone for $X_4$ and tone for $X_{20}$), there are intermediate tones which are supplied by different ones of the transmit antennas.

Modifications to this arrangement may be desirable. For instance, in the example described above the distributor 306 receives 120 symbols and divides them among four transmitters. Each cluster within a subset of tones can be constituted by a single tone rather than a group of adjacent tones. Thus, one possible modification to the arrangement of FIG. 3 would assign the tones corresponding to symbols $X_0$, $X_4$, $X_8$, $X_{12}$, $X_{16}$ etc. to antenna 1 and the tones for symbols $X_1$, $X_5$, $X_9$, $X_{13}$, etc. to antenna 2 and so on. This arrangement should achieve a substantially similar result in that the improvement arises from the spreading out of the tones for a given antenna over the entire transmission spectrum and interleaving the tones carried by various ones of the antennas.

In another modification to improve received signal strength at the receiver it might be appropriate to send the same signals on multiple transmitters. In this instance, it is conceivable to employ, for example, eight transmit antennas where each antenna is separate and distinct and thus provides different paths each having their own characteristics. Then, the same configuration as described with respect to FIG. 3 could be employed with the change being that the same output stream provided to $309_l$ could also be provided to another antenna so that two transmit antennas would be responsible for transmitting symbols $X_0$ to $X_4$, $X_{20}$ to $X_{24}$ and so on. This could improve the overall receive characteristics.

In yet another modification to this design it is possible to vary the tone assignment among the transmit antennas. As an example, should the path associated with transmit antenna $309_l$ have characteristics which are adverse to the tones for symbols $X_0$ to $X_4$ this problem can be alleviated by rotating the assignment of the clusters of tones among the various antennas. Therefore, in a first instance a first block of 120 symbols might be assigned in the manner illustrated in FIG. 3. A second block could be transmitted with a different set of tone assignments, e.g., $309_l$ receiving tones for symbols $X_{15}$ to $X_{19}$, $X_{35}$ to $X_{39}$, etc. This changing of the assignment of tones to a given transmit antenna assists in avoiding potential adverse impacts of a given antenna's transmission characteristic upon any of the carrier tone or tone clusters. This could be accomplished by inserting a switching arrangement between the IFFT's ($307_l$–$307_M$) and the RF circuitry so that the IFFT's are alternately assigned to the respective antennas.

Of course, one of ordinary skill in the art would recognize that given this description of various modifications to the first embodiment of FIG. 3 that combinations of these modifications would also be possible. For example, the rotation of carrier tones among transmit antennas could also be performed when transmitting individual tones rather than clusters of tones.

The inventors also recognize that the way the coding is done can have a positive influence on the word error rate to thereby further address the link budget problem. In particular, the inventors have selected Reed-Solomon (R-S) encoding. In an example of such an encoding scheme each R-S symbol is constituted by six bits of information and the R-S block is constituted by a predetermined number of R-S symbols with a certain subset of those symbols being directed to data symbols and the remaining being directed to parity symbols. As is known, whether there is one bit of an R-S symbol which is in error or whether there are multiple bits of the R-S symbols that are in error, it takes two parity symbols to correct each R-S symbol in error unless the location of the R-S symbol that is in error is known. In the latter circumstance such an R-S symbol is considered an erasure and only one parity symbol is necessary to correct such an error. To enhance the through-put of data it is desirable to keep the number of parity symbols low. However, to accomplish this goal it is beneficial to construct the R-S data symbols in a manner that maximizes the concentration of errors, i.e., rather than spreading out data bit errors over multiple symbols it is desirable to increase the likelihood that those bits that will be in error will be in the same R-S symbol.

Figure 4:
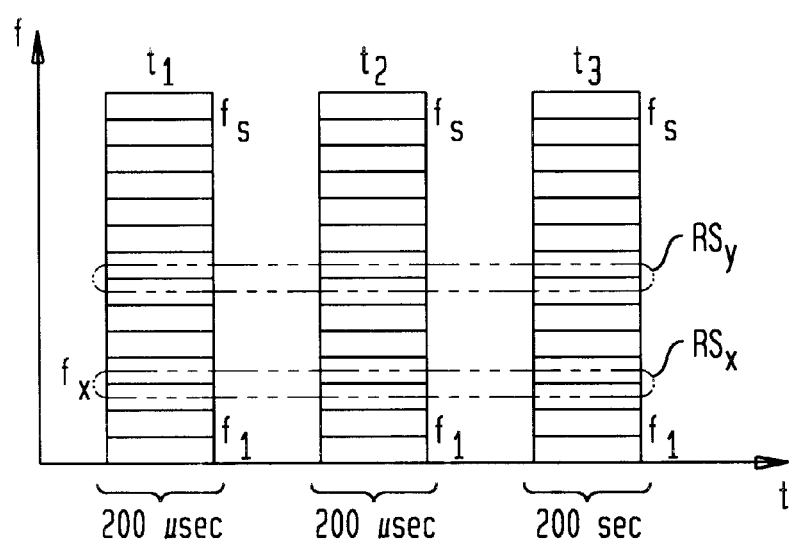
FIG. 4 illustrates a graphical representation of a second aspect of the present invention.

The inventors have determined that the optimum way to concentrate these bit errors is to group the modulator symbols in time rather than by frequency. As shown in the example of FIG. 4, there are three blocks of multicarrier signals shown at different times each with a time width of 200 microseconds. The frequencies $f_1$ to $f_s$ correspond to the multicarriers over the transmission spectrum. The inventors discovered that it is beneficial to construct a given R-S symbol, for example R-$S_x$ from three symbols of the same frequency over the three consecutive time periods. Thus, for example, R-$S_x$ would be comprised of frequency $f_x$ at time $t_1$, $f_x$ at time $t_2$ and $f_x$ at time $t_3$. The actual construction of these Reed-Solomon symbols and code words are described in relation to FIGS. 3 and 5.

As illustrated in FIG. 3, the modulator symbols at the output of the modulator are provided to a symbol grouper 302. An example of a sequence of data bits is shown at 51 in FIG. 5. In one more specific embodiment of the present invention the modulator 301 is a serial QPSK (Quadrature Phase Shift Key) modulator. In this embodiment the modulator converts a block of 360 data bits into 180 2-bit symbols ($d_0$ to $d_{179}$). Each R-S symbol is six bits in length, thus three QPSK symbols can be grouped to form a single R-S symbol. In accordance with the inventors' discovery regarding time grouping of symbols as illustrated in FIG. 4, three symbols consecutive in time rather than frequency can be grouped together to form the R-S symbol. For instance, where there are 180 2-bit symbols there are three blocks of sixty 2-bit symbols: $d_0$ to $d_{59}$ at transmission time $t_1$, $d_{60}$ to $d_{119}$ at transmission time $t_2$, and $d_{120}$ to $d_{179}$ at transmission time $t_3$. Thus, a grouping in time of three 2-bit symbols to create an R-S symbol could be effected by grouping symbols $d_0$, $d_{60}$ and $d_{120}$. The R-S coding shown in FIG. 3 would result in three sets of forty R-S symbols with each set containing 20 data symbols and 20 parity symbols. The decomposer 304 would then reconfigure the QPSK symbols within the R-S words in time to create time blocks of transmission symbols, e.g., $z_0$ to $z_{59}$, $Z_{60}$ to $z_{119}$, and $Z_{120}$ to $Z_{179}$. A serial to parallel converter 305 takes the symbol stream and creates a parallel configuration of 120 symbols at a time. A distributor 306 then divides the 120 symbols among the multiple transmit antennas in accordance with the carrier tone assignment for that given antenna in accordance with the discussions above.

Thus, in this exemplative arrangement there are 120 tones with a 160 $\mu$sec block size and a 40 $\mu$sec guard. This results in subchannels that are spaced by 6.25 kHz, block rates of 5 kbaud, and a total rate of 600 kbaud or equivalently channel bit rates of 1.2 Mbps for QPSK.

Figure 6:
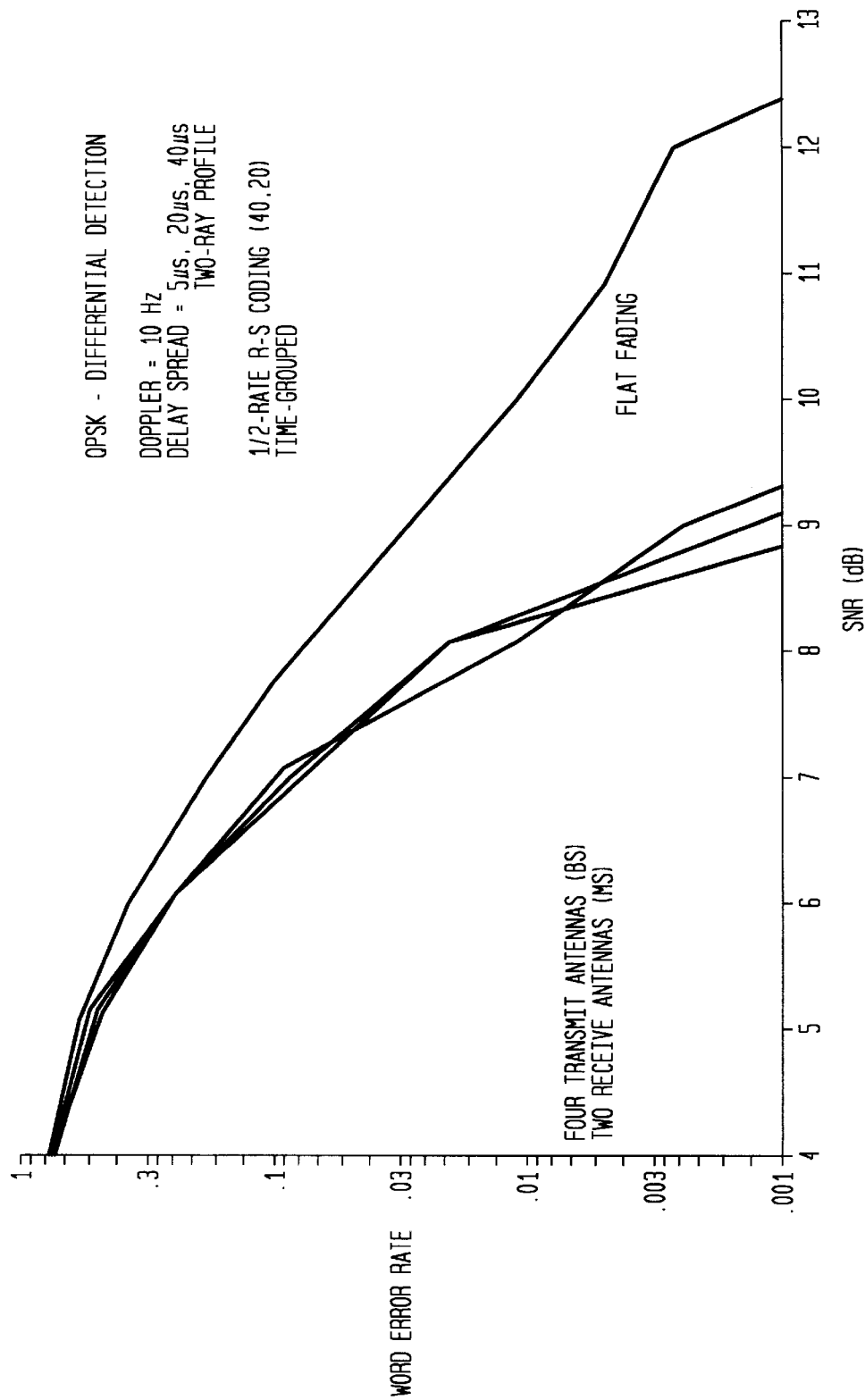
FIG. 6 illustrates how the embodiment of the present invention operates to improve upon link budget shortfalls.

The combination of the coding technique with the assignment of tones to the various transmit antennas has shown an ability to substantially overcome the link budget problem described above. As shown in FIG. 6 where R-S encoder provides 40 symbol words each word including 20 parity symbols with 20 time grouped data symbols, a desired word error rate WER of 1% requires less than 8.5 dB signal to noise ratio rather than the 17 to 20 dB which is typically required for cellular systems. This represents about a 9 dB reduction in the link budget shortfall discussed above. This significantly improves the ability to transmit high speed data in the wireless environment.

In connection with the actual error detection at the receiver end, and with a goal in mind of maximizing the use of the parity symbols it is possible to designate a percentage of the parity symbols as being related to correcting erasures and the remaining being directed to correcting errors. For example, where there are 20 parity symbols it is possible to correct ten erasures (one symbol per erasure) and five errors (two symbols per error). To accomplish this end in a given R-S word the algorithm can designate that the ten least powerful R-S symbols can be treated as erasures and corrected as such. Then five additional errors could be corrected if they exist in any of the remaining R-S symbols. Other criteria for estimating that an erasure has occurred can be employed such as measuring the bit error rate or using an "inner code" (an error detection code) to detect where errors occur.

Figure 5:
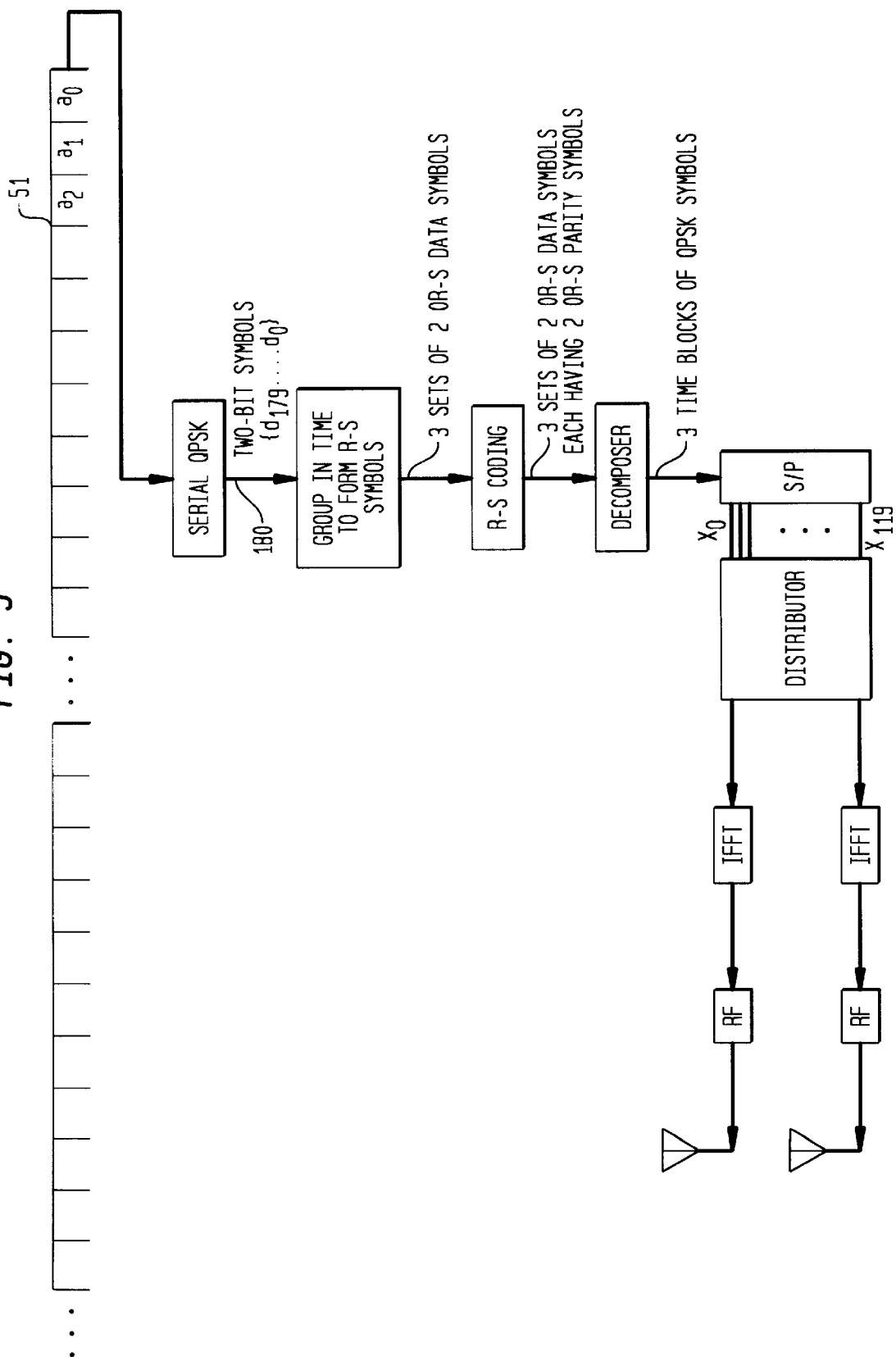
FIG. 5 illustrates, in block diagram form, a more detailed embodiment of the present invention.

The exemplative embodiments illustrated in FIGS. 3 and 5 can be constructed using well known components. First, the R-S encoder can be constituted by the Reed-Solomon Error Correction Device sold by Advanced Hardware Architectures of Washington State.

The signal processing functions can be implemented in a DSP which provides IFFTs as is well known. The time grouping and decomposing can be implemented using buffers. For example, to group-in-time a buffer could store 120 2 bit symbols and then those symbols could be read out in a predetermined time order. Similarly for the decomposer the R-S code words could be stored in a buffer and the individual 2-bit symbols within the code word could be read out in a predetermined order. Also, the distributor can take the form of a de-multiplexer in that it takes the symbols from the Serial/Parallel converter and passes selected symbols to selected IFFTs which is simply the dividing up of information between channels, a common demultiplexing function.

To further enhance the receiving characteristics at the mobile station, it is possible to employ multiple antennas, e.g., two. The signals from the two antennas can then be combined so as to further reduce the likelihood that any significant number of the carrier tones is insufficiently received.

In the foregoing the Applicants have described two techniques which can be employed in connection with the wireless transmission of data to increase bit rate, namely the assignment of carrier tones to multiple transmit antennas with the carrier tones assigned to any one antenna being spread over the transmission spectrum and a particular type of coding technique. These two aspects can be employed separately or they can be combined together to further improve the achievable bit rate.

What is claimed is:

1. A method for high-speed wireless transmission of data over a transmission spectrum comprising the steps of:

creating a stream of data;

encoding said stream of data to create a plurality of symbols, wherein said step of encoding includes the substeps of, grouping said data in said stream to create multi-bit coding symbols, each coding symbol containing a plurality of modulation symbols grouped in time, and generating a code word from a plurality of coding symbols, said code word corresponding to a Reed-Solomon code, assigning each of said plurality symbols to one of a plurality of carrier tones;

providing each of said carrier tones to one of a plurality of transmission antennas, in such a way that each antenna receives a subset of said plurality of carrier tones and each subset of said plurality of carrier tones includes at least two carrier tones not adjacent to one another in the transmission spectrum and having at least one carrier tone therebetween that is provided to another one of said plurality of transmission antennas; and simultaneously transmitting the subsets of carrier tones from said plurality of transmission antennas.

2. The method of claim 1 wherein in one subset of said plurality of carrier tones the carrier tones are uniformly distributed over the transmission spectrum.

3. The method of claim 1 wherein in one subset of said plurality of carrier tones the carrier tones are distributed over the transmission spectrum in a non-uniform manner.

4. The method of claim 1 wherein at least two subsets of said plurality of carrier tones on separate antennas include the same carrier tones.

5. The method of claim 1 wherein for a given one of plurality of transmission antennas a first subset of carrier tones at a first time and a second subset of carrier tones at a second time include different carrier tones.

6. A method for high speed wireless transmission of data over a transmission spectrum comprising the steps of:

creating a stream of digital data;

grouping said digital data in said stream to create multi-bit coding symbols, each coding symbol containing a plurality of modulation symbols grouped in time;

generating a code word from a plurality of coding symbols, wherein said step of generating generates a Reed-Solomon code;

assigning each of said modulation symbols to one of a plurality of carrier tones; and providing each of said carrier tones to one of a plurality of transmission antennas; and transmitting said plurality of carrier tones from said plurality of transmission antennas.

7. The method of claim 6 wherein each of said plurality of transmission antennas is provided with a plurality of carrier tones.

8. A high-speed wireless transmission system that includes a plurality of transmission antennas, the system comprising:

a modulator that receives a data stream and creates a plurality of modulated symbols;

an encoder coupled to said modulator and that receives said plurality of modulated symbols and outputs encoded words;

a splitter coupled to said encoder and that receives said code words as input and assigns modulated symbols in said code words to the plurality of transmission antennas;

a transmitter coupled to said encoder and that receives coded symbols assigned to an antenna associated with said transmitter and that provides a data transmission signal including a plurality of non-adjacent carrier tones to the associated transmission antenna;

wherein said plurality of non-adjacent carrier tones comprises a subset of a plurality of carrier tones and wherein at least one carrier tone that is between non-adjacent carrier tones of said subset is assigned to another one of said plurality of transmission antennas.

9. System of claim 8 wherein said modulated symbols are assigned to the plurality of transmitters in a manner to provide a uniform distribution of symbols over the transmission bandwidth.

10. The system of claim 8 wherein said modulated symbols are assigned to the plurality of transmitters in a manner to provide a randomized distribution of symbols over the transmission bandwidth.

11. A high-speed wireless transmission system that includes a plurality of transmission antennas, the system comprising:

a modulator that receives a data stream and creates a plurality of modulated symbols;

an encoder coupled to said modulator and that receives said plurality of modulated symbols and outputs encoded words;

a splitter coupled to said encoder and that receives said code words as input and assigns modulated symbols in said code words to the plurality of transmission antennas;

a transmitter coupled to said encoder and that receives coded symbols assigned to an antenna associated with said transmitter and that provides a data transmission signal including a plurality of non-adjacent carrier tones to the associated transmission antenna;

wherein said plurality of non-adjacent carrier tones comprises a subset of carrier tones including two clusters of adjacent carrier tones.

12. The system of claim 11 wherein said modulated symbols are assigned to the plurality of transmitters in a manner to provide a uniform distribution of symbols over the transmission bandwidth.

13. The system of claim 11 wherein said modulated symbols are assigned to the plurality of transmitters in a manner to provide a randomized distribution of symbols over the transmission bandwidth.

* * * * *